United States Patent Office 2,898,781
Patented Aug. 11, 1959

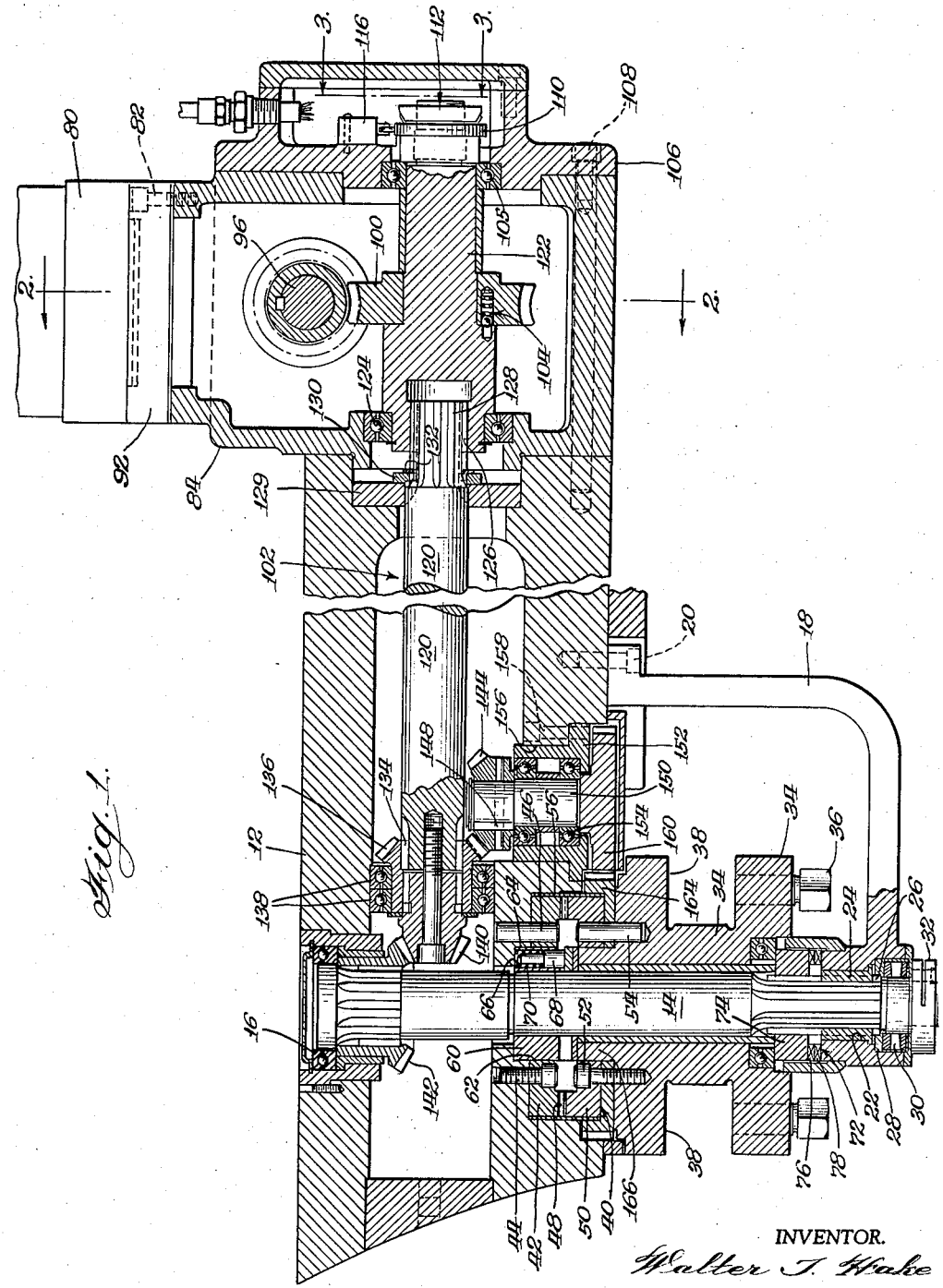

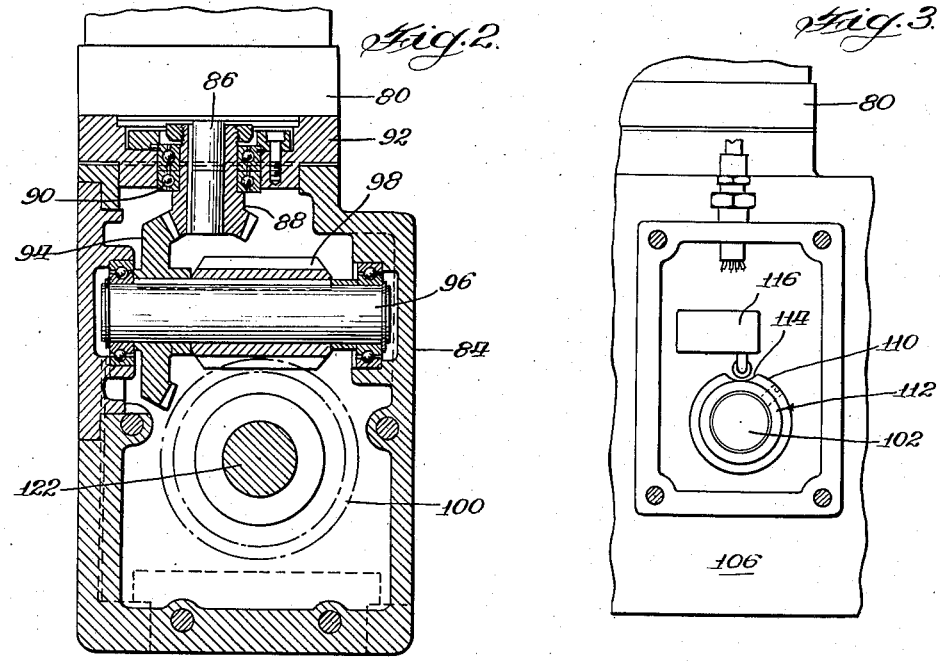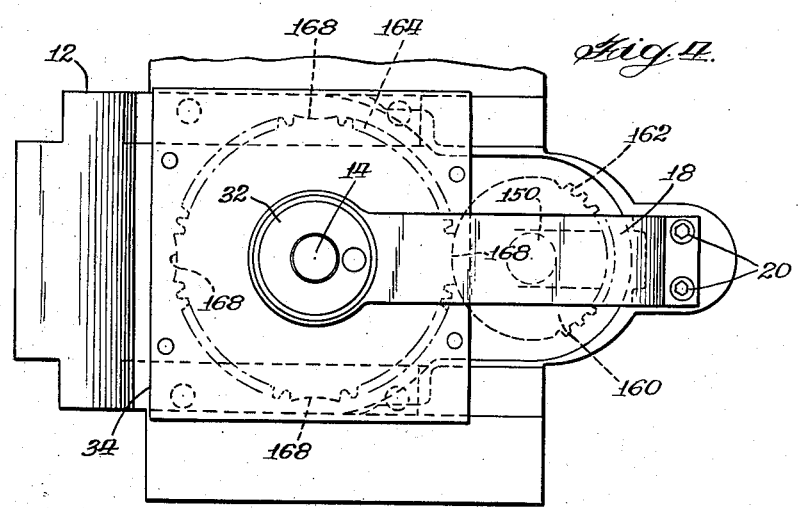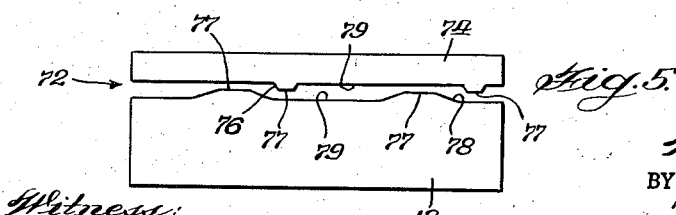

2,898,781
POWER INDEXING ARRANGEMENT FOR SIDE HEAD TOOL BLOCK

Walter T. Hake, Cincinnati, Ohio, assignor to American Steel Foundries, Chicago, Ill., a corporation of New Jersey Application October 22, 1957, Serial No. 691,685

8 Claims. (Cl. 74—820)

This invention relates to metal cutting machines and more particularly to an arrangement for power indexing a multiple tool holding block of a metal cutting machine.

In metal cutting machines, such as vertical boring and turning machines, a work piece is mounted on a work table and rotatable therewith on a vertical axis. A power indexable tool holding turret is generally provided for performing certain of the metal cutting operations. A side head arrangement is also provided comprising a side head movable upwardly and downwardly on ways provided on the machine. The side head carries a ram which is movable toward and away from the vertical axis of the table on ways provided in the side head. The tool holding device which is carried by the ram may hold one tool or may be adapted to carry a plurality of tools mounted in a tool block which is indexable through a corresponding number of positions whereby the tool may be presented to the work piece in successive selectable steps.

Generally the tool block in the latter type of arrangement is manually indexable and is therefore not adaptable to completely automatic programming. Power indexing has been provided in prior art machines but these have been complex, cumbersome attachments.

A primary object, therefore, of this invention is to provide a power tool block indexing arrangement which is carried primarily internally of the side head ram and requires little space externally thereof.

A further object of the invention is to provide a side head tool block power indexing arrangement having a compact structure readily accessible for repair and maintenance.

Other objects and various advantages will be apparent from the following description and accompanying drawings wherein:

Figure 1 is a horizontal sectional view, partially fragmentary, through the novel power indexing arrangement as applied to the side head ram of a vertical boring and turning machine;

Figure 2 is a sectional view taken along the line 2—2 of Figure 1;

Figure 3 is a fragmentary end elevational view along line 3—3 of Figure 1;

Figure 4 is a fragmentary front elevational view of the device of Figure 1 showing the support arm, tool block and intermittent gear arrangement, and Figure 5 is a developed view of a clamping-unclamping cam arrangement utilized in the invention.

Referring to the drawings it is seen that the side head ram is shown without regard to its relationship to the side head and the boring and turning machine proper because this relationship is well known to those familiar with this art.

The ram 12, which supports the tool block assembly, carries for rotation therein a horizontally disposed shaft 14, which is supported at its inner end by anti-friction bearing 16 in a conventional manner. Shaft 14 extends outwardly of the ram and is supported at its extreme outer end by a support arm 18, which is secured, as by cap screws 20, to the outer face of the ram 12. The arm 18 is provided with an opening 22 in which is received a sleeve bearing 24 which in turn receives the splined end 26 of shaft 14.

A spacer 28 and a thrust bearing 30 are provided to accommodate axial loads imposed on the arrangement, as will be explained hereinafter. A conventional lock nut 32 is threaded on the end of shaft 14 to maintain the assembled relationship of the various components. A tool block 34 is carried on the extending portion of the shaft 14 and is rotatable about the shaft and also linearly movable along the shaft toward and away from the ram. The tool block is provided with a plurality of screws 36 to clamp the various tools in the openings 38.

Surrounding the shaft and disposed between the ram and the tool block is a multiple tooth coupling generally indicated at 40. The coupling, which constitutes a locating-locking arrangement, comprises a ram member 42 which is preferably secured to the ram by means of a plurality of cap screws 44. One or more of dowel pins 46 are utilized to accurately position the coupling member 42. The member 42 is provided on its outer face with a plurality of annularly disposed teeth 48 which are mutually engageable with corresponding teeth of a tool block coupling member 50 which is secured to the tool block 34 by means of a plurality of cap screws 52 and accurately located by means of one or more dowel pins 54. A stainless steel sleeve 56 surrounds the multiple tooth coupling 40 and is fixedly positioned relative to the ram member 42. The sleeve is adapted to accommodate sliding movement of the member 50 as the coupling engages and disengages. The coupling arrangement 40 provides accurate positioning of the tool block in each indexed position and also provides positive locking against rotation of the tool block relative to the ram.

A spring housing 60 surrounds the shaft 14 and is received within an opening 62 in the member 42 and also in a counter-bored opening 64 in the ram 12. The housing 60 is provided with a plurality of openings 66 which carry internally thereof a plunger 68 biased outwardly by means of a spring 70 whereby a constant force is exerted on the tool block.

A clamping-unclamping mechanism, generally indicated at 72, is shown in Figures 1 and 5 and serves the dual purpose of moving the teeth of coupling 40 out of engagement to permit power indexing of the tool block and of moving the teeth of the coupling 40 back into engagement to accurately locate and lock the tool block in the indexed position. The clamping-unclamping mechanism comprises a cam member 74 which is splined to the shaft 14 for rotation therewith and is provided on the outer face thereof with a cam track 76. A cam track 78 is provided on the inner face of the end portion of support arm 18, said cam track being axially aligned with the cam track 76.

The clamping-unclamping arrangement is shown more clearly in the developed view thereof in Figure 5. Referring to this figure, it is seen that the cam tracks 76 and 78 are provided with high lands 77 and low lands 79. It is seen also that when the shaft 14 and cam member 74 are rotated so that the high lands of cam tracks 76 and 78 are engaging each other the tool block, which is movable axially of the shaft 14, is urged inwardly into located and clamped position. Conversely, when the shaft 14 and cam member 74 are rotated to a position wherein the high lands of one cam member are positioned oppositely of the low lands of the other cam member, the tool block 14 is free to move outwardly and is urged outwardly to unclamped position by means of the springs 70 and plungers 68.

The locating-locking arrangement and the clamping-unclamping arrangement are not per se a part of the present invention and are more completely described in copending application Serial No. 560,637, filed January 23, 1956, in the name of Walter T. Hake. However, it is clear from the foregoing description that rotation of shaft 14 through a portion of a revolution causes the tool block to be moved outwardly to a position in which it is free to rotate about the shaft 14 to successive indexed positions and that continued rotation of shaft 14 causes the tool block to be moved once again by the clamping-unclamping mechanism 72 into locked position.

Power for indexing the tool block is supplied by a torque motor 80 which is fastened to a spacer block 92 by means of a plurality of cap screws (not shown), and the block 92 is in turn secured by means of cap screws 82 to a gear box 84 which is bolted or otherwise secured to the end of the ram 12. As best seen in Figure 2, the output shaft 86 of the motor drivingly carries a gear 88 which is also bearing supported, as at 90, in the spacer block 92 in a conventional manner. The gear 88 is arranged to drive a gear 94 which is keyed to a worm shaft 96 which is bearing mounted for rotation in the gear box 84. Also keyed to the shaft 96 for rotation therewith is a worm 98 arranged to drive a worm wheel 100 which is rotatably mounted on a two piece main drive shaft indicated generally at 102. Driving engagement between the worm wheel 100 and the drive shaft 102 is accommodated by a plurality of spring loaded ball detent arrangements generally indicated at 104 (Figure 1). The ball detent arrangements also constitute a safety device so that if some portion of the mechanism jams, the worm wheel 100 and drive shaft 102 will rotate relative to each other, thereby preventing breakage to any portions of the mechanism.

The drive shaft 102 is bearing supported as at 105 in a gear box cover 106 which is secured to the end of the gear box preferably by a plurality of cap screws 108. The outwardly extending end of the drive shaft 102 projects into the cover 106 and carries for rotation therewith a timing cam 110 (Figures 1 and 3) and the assembly is maintained by means of a conventional lock washer and lock nut assembly 112. The timing cam 110 is provided on the periphery thereof with a slot 114 arranged to actuate a switch 116 to determine the end of one complete revolution of the drive shaft.

The main drive shaft 102, for assembly and maintenance purposes, is made in two separate sections, 120 and 122. Section 122 of the shaft is also bearing supported by ball bearings 124 mounted in the gear box 84 so that the gear box 84 and all the components thereof may be removed as a unit from the ram. The shaft section 122 is provided with an internal spline 126 arranged to receive the splined end 128 of shaft section 120 whereby rotation of section 122 is transmitted to the section 120. The proper axial position of shaft 120 is maintained by means of a spacer ring 129, a lock ring 130, and a snap ring 132 in a manner which is familiar to those skilled in the art. The ring 129 also serves to support shaft 120 when the gear box 84 is removed.

Section 120 of the drive shaft carries a spline 134 at its inwardly extending end. Spline 134 is arranged to drivingly engage a corresponding internal spline of a gear 136 which is rotatably mounted in the ram 12 by means of bearings 138. The gear 136 extends beyond the end of shaft section 120 and is arranged to support and drivingly engage a splined gear 140 which in turn drives a gear 142. The gear 142 is splined to the shaft 14 whereby rotation of the shaft 102 is transmitted through gear 136, gear 140, and gear 142 to the shaft 14. The ratio between the gears 140 and 142 is 1:2 so that the shaft 14 rotates one-half of a revolution for each revolution of the shaft 102. However, referring for a moment to Figure 5, it is seen that cam tracks 76 and 78 are provided with two high lands and two low lands so that the tool block 34 is moved to unclamping position and again to clamping position in one-half of a revolution of the shaft 14.

The gear 136 meshes with a gear 144 keyed as at 148 to a shaft 150 for rotation therewith. The shaft 150 is rotatably mounted in a flanged insert 152 by means of anti-friction bearings 154, the insert 152 being received within an opening 156 in the ram and retained therein by means of a plurality of cap screws 158. Preferably formed integrally with the shaft 150 is a pinion 160 which is best seen in Figures 1 and 4. The pinion 160 is provided with teeth 162 around only a portion of its periphery and is intermittently engageable, as will be explained hereinafter, with an intermittent gear 164. Gear 164 is mounted on a projecting hub 166 extending inwardly from the tool block 34 and is interposed between the tool block 34 and the coupling member 50. The gear 164 therefore is rotatable and axially movable with the tool block 34 and the coupling member 50. The teeth of the intermittent gear 164 are arranged in groups of a number corresponding to the number of tool holding positions of the tool block, in the disclosed instance four, each of the four groups being separated by a portion 168 having no teeth.

The electrical controls for the device have not been illustrated because they do not form a part of the present invention and include conventional circuits familiar to those skilled in this art.

In operation, the machine operator depresses a button (not shown) to energize the torque motor 80. The motion of the motor shaft is transmitted through the gear box mechanism to the drive shaft 102 and also to the timing cam 110. The motion of shaft 102 is transmitted in the manner described heretofore to the shaft 14 and simultaneously to the shaft 150 and pinion 160.

Motion of shaft 14 and of the cam member 74 which is splined thereto causes the high lands 77 of cam track 76 to move into juxtaposition with the low lands 79 of cam track 78, whereupon the springs 70 urge the tool block 34 and the coupling member 50 axially of shaft 14 whereby the teeth of the coupling members 42 and 50 become disengaged. This movement constitutes the unclamping portion of the cycle during which time no rotational movement is imparted to the tool block because the teeth 162 of pinion 160 have not come into engagement with the teeth of gear 164.

When the unclamping portion of the cycle is completed, gear 160 has rotated sufficiently so that teeth 162 engage one of the groups of teeth on gear 164. Gear 164 is therefore rotated and carries with it the tool block 34 which is thereby indexed to the next subsequent position. At this time the gear 160 has rotated sufficiently so that the teeth 162 become disengaged from the teeth of gear 164. During the indexing portion of the cycle, the high lands of cam track 76 ride along the flat portion of the cam track 78 which is between the high lands thereof.

At the completion of the indexing portion of the cycle, the high lands of cam track 76 once again ride upwardly onto the high lands of cam track 78 whereby the tool block and coupler member are moved against the pressure of springs 70 once again into accurate engaged and locked position, thereby completing the clamping portion of the cycle. At the end of the cycle, the actuator arm of switch 116 drops into the slot 114 on cam 110 thereby breaking a circuit to stop the torque motor 80.

From the above description, it is seen that this invention provides a compact, inexpensive, self-contained power indexing arrangement for a multiple tool holder block, most of the parts of which are positioned entirely internally of the ram member of the machine.

I claim:

1. In a power indexing arrangement for a tool block, the combination of: a ram; a shaft rotatably carried by said ram; a tool block mounted on said shaft for rotation thereon and for axial movement therealong; means to locate and lock said block in sequential selectable indexed positions; cam means responsive to rotation of said shaft for moving said block axially of said shaft in one direction to unlocked position prior to indexing and subsequently moving said block axially of said shaft in the opposite direction to locked position after indexing; a drive shaft internally of said ram for rotating said first mentioned shaft; and power means for driving said drive shaft.

2. In a power indexing arrangement for a tool block, the combination of: a ram; a shaft rotatably carried by said ram; a tool block mounted on said shaft for rotation thereon and for axial movement therealong; means responsive to rotation of said shaft to locate and lock said block in sequential selectable indexed positions; a power drive shaft rotatably carried by said ram internally thereof; a geared connection between said shafts; and means interconnecting said drive shaft and said tool block and responsive to continuous motion of said drive shaft for imparting intermittent motion to said block.

3. In a power indexing arrangement for a tool block, the combination of: a ram; a shaft rotatably carried by said ram; a tool block mounted on said shaft for rotation thereon and for axial movement therealong; means responsive to rotation of said shaft to locate and lock said block in sequential selectable indexed positions; a power drive shaft rotatably mounted internally of said ram; a gear keyed to said drive shaft for rotation therewith; a second gear carried by the first mentioned gear and rotatable therewith; a third gear keyed to said tool block shaft and meshed with said second gear whereby motion of said drive shaft is transmitted continuously to said tool block shaft; and means driven by said first mentioned gear and responsive to continuous motion of said drive shaft for imparting intermittent motion to said tool block during an indexing cycle.

4. In a power indexing arrangement for a tool block, the combination of: a ram; a shaft rotatably carried by said ram; a tool block mounted on said shaft for rotation thereon and for axial movement therealong; means responsive to rotation of said shaft to locate and lock said block in sequential selectable indexed positions; a power drive shaft rotatably carried by said ram internally thereof; a geared connection between said shafts; an intermittent gear rotatably mounted on said tool block shaft and secured to said tool block for rotation therewith; and a gear segment driven by said drive shaft and engageable with said intermittent gear for moving said tool block one indexing step for each revolution of said drive shaft.

5. In a power indexing arrangement for a tool block, the combination of: a ram; a shaft rotatably carried by said ram; a tool block mounted on said shaft for rotation thereon and for axial movement therealong; means responsive to rotation of said shaft to locate and lock said block in sequential selectable indexed positions; a power drive shaft rotatably mounted internally of said ram; a gear keyed to said drive shaft for rotation therewith; a second gear carried by the first mentioned gear and rotatable therewith; a third gear keyed to said tool block shaft and meshed with said second gear whereby motion of said drive shaft is transmitted directly to said tool block shaft; an intermittent gear rotatably mounted on said tool block shaft and secured to said tool block for indexing movement therewith; a gear segment operatively connected to said first mentioned gear and intermittently engageable with said intermittent gear for moving said tool block through successive indexing steps.

6. In a power indexing arrangement for a side head tool block of a vertical boring and turning machine, the combination of: a ram; a shaft mounted for rotation in the ram, a portion of said shaft extending outwardly thereof; a multiple tool holding block mounted on said shaft portion for rotation thereon and axial movement relative thereto to clamped and unclamped positions; means responsive to rotation of said shaft for axially moving said block; and means internally of said ram for rotating said shaft to move said block sequentially to unclamped and to clamped position, and for indexing said block while the latter is in unclamped position.

7. In a power indexing arrangement for a side head tool block of a vertical boring and turning machine, the combination of a ram; a shaft mounted for rotation in the ram, a portion of said shaft extending outwardly thereof; a multiple tool holding block mounted on said shaft portion for rotation thereon and axial movement relative thereto to clamped and unclamped positions; means responsive to rotation of said shaft for axially moving said block; and means internally of said ram for rotating said shaft to move said block sequentially to unclamped and to clamped position, and for indexing said block while the latter is in unclamped position, said last mentioned means comprising a power shaft having a geared connection to the first mentioned shaft, and intermittent gear means operatively connecting said power shaft to said tool block.

8. In a power indexing arrangement for a side head tool block of a vertical boring and turning machine, the combination of: a ram; a shaft mounted for rotation in the ram, a portion of said shaft extending outwardly thereof; a multiple tool holding block mounted on said shaft portion for rotation thereon and axial movement relative thereto to clamped and unclamped positions; means responsive to rotation of said shaft for axially moving said block; and means internally of said ram for rotating said shaft to move said block sequentially to unclamped and to clamped position, and for indexing said block while the latter is in unclamped position, said last mentioned means comprising a power shaft having a geared connection to the first mentioned shaft and arranged to make one complete revolution for each indexing movement of the tool block, motor means for driving said power shaft, and cam operated switch means for deenergizing said motor means at the end of an indexing movement.

References Cited in the file of this patent
UNITED STATES PATENTS
2,384,809    Bullard et al. _____ Sept. 18, 1945